(12) United States Patent
Mattschull

(10) Patent No.: US 7,810,437 B2
(45) Date of Patent: Oct. 12, 2010

(54) SHOCK ABSORBER FOR THE FRONT OR REAR REGION OF A RAILBORNE VEHICLE HAVING AT LEAST ONE ENERGY ABSORPTION DEVICE

(75) Inventor: Volker Mattschull, Braunschweig (DE)

(73) Assignee: Voith Patent GmbH, Heidenheim (DE)

( * ) Notice: Subject to any disclaimer, the term of this patent is extended or adjusted under 35 U.S.C. 154(b) by 137 days.

(21) Appl. No.: 12/230,854

(22) Filed: Sep. 5, 2008

(65) Prior Publication Data

US 2009/0058109 A1  Mar. 5, 2009

(30) Foreign Application Priority Data

Sep. 5, 2007  (EP) .................. 07017390

(51) Int. Cl.
*B61D 15/06*  (2006.01)
(52) U.S. Cl. .................. 105/392.5; 213/220; 213/221
(58) Field of Classification Search .............. 105/392.5; 213/220, 221, 223, 224; 293/132, 134, 135–137, 293/150, 152
See application file for complete search history.

(56) References Cited

U.S. PATENT DOCUMENTS

| 1,901,227 | A | * | 3/1933 | Cossalter ................... 293/131 |
| 3,512,822 | A | * | 5/1970 | Rich et al. ................... 293/107 |
| 3,820,834 | A | * | 6/1974 | Wilfert et al. ............... 293/150 |
| 4,003,594 | A | * | 1/1977 | Tommeraas ................. 293/131 |
| D245,597 | S | * | 8/1977 | Gee et al. ................... D12/169 |
| 4,251,096 | A | * | 2/1981 | Stock .......................... 293/150 |
| 4,399,764 | A | * | 8/1983 | Menz ........................... 114/219 |
| 6,561,105 | B2 | * | 5/2003 | Godin et al. ................ 105/396 |
| 6,820,759 | B1 | * | 11/2004 | Schindler et al. ........... 213/221 |
| 6,845,874 | B2 | * | 1/2005 | Payne et al. ................. 213/221 |
| 7,063,364 | B2 | * | 6/2006 | Bird et al. ................... 293/154 |
| 7,478,849 | B2 | * | 1/2009 | Fortin ......................... 293/120 |
| 2009/0058109 | A1 | * | 3/2009 | Mattschull .................. 293/102 |

FOREIGN PATENT DOCUMENTS

| DE | 2104797 | 8/1972 |
| DE | 4303549 | 8/1994 |

* cited by examiner

*Primary Examiner*—S. Joseph Morano
*Assistant Examiner*—Jason C Smith
(74) *Attorney, Agent, or Firm*—Jean C. Edwards, Esq.; Akerman Senterfitt

(57) ABSTRACT

The invention relates to an energy absorption device as part of a shock absorber for the front or rear region of a railborne vehicle, in particular a streetcar vehicle, wherein the energy absorption device is designed to absorb or dissipate at least a portion of the impact energy which occurs when the vehicle impacts an obstacle. The invention includes a bumper bar which is pivotably connected to the vehicle underframe by a first bearing, a pendulum support connected to the bumper bar by a second bearing and to the vehicle underframe by a third bearing such that the bumper bar and pendulum support form a tripod. The resultant moment of force of the bumper bar pivoting about a pivot axis defined by a first bearing is introduced as linear force into the energy-absorbing mechanism and at least partly absorbed or dissipated there.

16 Claims, 8 Drawing Sheets

SHOCK ABSORBER FOR THE FRONT OR REAR REGION OF A RAILBORNE VEHICLE HAVING AT LEAST ONE ENERGY ABSORPTION DEVICE

CROSS-REFERENCE TO RELATED APPLICATIONS

The present invention claims priority from European Patent Application No. 07 017 390.1, filed Sep. 5, 2007, the contents of which are herein incorporated by reference in their entirety.

BACKGROUND OF THE INVENTION

1. Field of the Invention

The invention relates to an energy absorption device for a railborne vehicle, in particular a streetcar vehicle, wherein the energy absorption device is designed so as to absorb or dissipate at least part of the impact energy which occurs when the vehicle impacts an obstacle. The invention moreover relates to a shock absorber for the front or rear region of a railborne vehicle, in particular a streetcar vehicle, wherein the shock absorber includes at least one energy absorption device as noted above which is connectable to the vehicle underframe at the front or rear region of the vehicle.

2. Description of the Related Art

It is known to equip railborne vehicles such as track-borne vehicles, for example, with a shock absorber including at least one energy absorption device which serves to at least partly dissipate the impact force which occurs when the vehicle impacts an obstacle. An energy absorption device used in a shock absorber usually includes one or more energy-absorbing mechanisms. Destructively-designed energy-absorbing mechanisms have the function of protecting the underframe of the railborne vehicle, in particular also at high collision speeds.

Additionally to the at least one destructively-designed energy-absorbing mechanism, a regeneratively-designed energy-absorbing mechanism can be further provided, which usually serves to cushion the impact forces occurring during normal vehicle operation.

In conventional shock absorbers, the regeneratively-designed energy-absorbing mechanism is designed so as to cushion the tractive and impact forces occurring during the normal operation of the vehicle, wherein the damping capacity of the regeneratively-designed energy-absorbing mechanism is often only dimensioned up to a fixed maximum force. In other words, after the operating load of the regeneratively-designed energy-absorbing mechanism is exceeded, for instance when the vehicle impacts an obstacle (i.e., a crash), the regeneratively-designed energy-absorbing mechanism is usually too limited to absorb the full amount of resultant impact energy.

So that the resultant impact energy will preferably not lead to high loads in such a case, in addition to the regeneratively-designed energy-absorbing mechanism, a destructively-designed energy-absorbing mechanism is for example provided downstream the regeneratively-designed energy-absorbing mechanism and designed so as to respond after the working absorption of the regeneratively-designed energy-absorbing mechanism has been exhausted and then absorb and dissipate at least some of the energy transferred in the force flow through the energy absorption device.

Conceivable as destructively-designed energy-absorbing mechanisms would, for example, be deformation tubes or crash boxes with which impact energy can be converted into the work of deformation and heat by a defined destructive deformation. A deformation tube used in a shock absorber as a destructively-designed energy-absorbing mechanism is characterized for example by exhibiting a defined activation force with no spikes in the force.

Buffers having a regenerative or self-restoring mode of operation, such as e.g., gas-hydraulic buffers, are known as regeneratively-designed energy-absorbing mechanisms. An energy-absorbing mechanism based on gas-hydraulic operation has a relatively low activation force compared to a deformation tube and exhibits—unlike a deformation tube—a speed-dependent response. On the other hand, energy-absorbing mechanisms based on hydrostatic operation such as e.g. a gas-hydraulic buffer, are also known as regeneratively-designed energy-absorbing mechanisms, same likewise functioning regeneratively, i.e., self-restoring. Compared to gas-hydraulic energy-absorbing mechanisms, hydrostatic energy-absorbing mechanisms have a higher activation force and initial load.

It has long been endeavored in rail vehicle technology to provide a shock absorber to protect the underframe of a railborne vehicle from extreme loads occurring in particular upon a crash with which at least a portion of the impact energy occurring during the transmitting of impact forces, for example upon a crash, can be effectively dissipated in a defined manner and pursuant a predictable sequence of events. It is necessary, both for a defined response as well as for a predefinable sequence of events when absorbing energy, for the impact force which is to be cushioned, and thus, the energy resulting from the transmitting of the impact force, to be introduced in as axial a manner as possible in the energy-absorbing mechanism(s) of the energy absorption device(s) provided in the shock absorber. This can be attributed to the fact that an energy absorption device normally employed in a shock absorber comprises an energy-absorbing mechanism such as, for example, a deformation tube or a crash box, whereby this energy-absorbing mechanism can usually only absorb forces in a predictable manner when they are introduced axially into the energy-absorbing mechanism.

For example, should a deformation tube or a crash box be employed as an energy-absorbing mechanism, there is the risk—when non-axial forces are introduced into the deformation tube—of "seizing" or wedging and canting, with the result that the response of the energy-absorbing mechanism on the one hand and the sequence of events during energy absorption on the other are no longer predictable.

These basic conditions for the effective functioning of an energy-absorbing mechanism are often inherent in the case of railborne vehicles such as e.g., streetcar vehicles, since a rail vehicle moving along a rail line, such as a regional transit train or a high-speed train, usually always comes upon an obstacle situated on the rail line from the frontal direction so that also when colliding with the obstacle, the resultant impact energy is introduced axially to the energy-absorbing mechanism of the energy absorption device provided in the shock absorber quasi "automatically," since the preferred direction of the energy absorption mechanism during energy absorption normally coincides with the longitudinal direction of the rail vehicle.

Streetcars, for example, however, represent a special case; i.e., railborne and specifically track-borne vehicles which are at least partly incorporated into normal road traffic. With these types of vehicles, the basic condition, according to which a collision with an obstacle is usually frontal, is no longer automatically met. If, for example, an automobile attempting to turn in traffic collides with an oncoming streetcar, it will often not collide with it frontally, but rather at an oblique side-on angle to the front. In such situations, in no way can this be deemed a frontal or substantially frontal collision.

Therefore, the problem on which the invention is based is that in terms of absorbing the impact energy which occurs upon a crash, the conventional solutions, for example known in rail vehicle technology and already effectively employed in regional transit or high-speed trains, are not or are at least not sufficiently suited to absorb or dissipate the impact energy occurring upon a non-axial and in particular side-on collision of the vehicle with an obstacle; i.e., pursuant a predictable sequence of events.

Given this problem as defined, the invention is thus, based on the task of further developing an energy absorption device of the type cited at the outset such that it can also absorb or dissipate the impact energy occurring upon a side-on collision of the vehicle with an obstacle according to a predefinable sequence of events.

SUMMARY OF THE INVENTION

Thus, proposed in accordance with the invention, is an energy absorption device including a bumper bar which is pivotably connectable or connected to the vehicle underframe of the railborne vehicle via a first bearing and further including a pendulum support having a first and a second end section, wherein the pendulum support is connectable or connected to the bumper bar by its first end section via a second bearing and by its second end section to the vehicle underframe via a third bearing such that the bumper bar and the pendulum support form a tripod. Further provided is an energy-absorbing mechanism which is designed and arranged within or interacts with the energy absorption device such that upon the bumper bar pivoting about a pivot axis defined by the first bearing, the resultant moment of force is introduced as linear force into the energy-absorbing mechanism to be at least partly absorbed or dissipated there.

The advantages obtainable with the inventive solution are in particular revealed when the functioning of the proposed energy absorption device is considered. By virtue of the bumper bar and the pendulum support forming a tripod, force acting on the bumper bar is initially deflected such that the force flow runs axially through the pendulum support. It is thus, conceivable to integrate the energy-absorbing mechanism into the pendulum support or downstream the pendulum support. Doing so ensures that the force flow running axially through the pendulum support is substantially introduced into the energy-absorbing mechanism in an orientation to the preferred direction of said energy-absorbing mechanism, i.e., linearly. The force flow energy introduced into the energy-absorbing mechanism as longitudinal force is thereafter at least partly converted and thus "eliminated."

The solution according to the invention thus, also enables a deflecting of the transverse forces occurring upon a side-on crash. This ensues in accordance with the invention with the help of the statically defined tripod which essentially consists of the bumper bar as the first leg of the tripod and the pendulum support as the second leg of the tripod, wherein the bumper bar and the pendulum support are connected together by means of a bearing (second bearing).

In detail, the first end of the bumper bar is pivotably connected to the vehicle underframe via a first bearing while at its second end, the pendulum support is articulated to its head second (first end section) via a second bearing. The base section (second end section) of the pendulum support is connected to the vehicle underframe by means of a third bearing, wherein the first bearing and the third bearing are distanced from one another and thereby form a statically defined tripod. The pendulum support is thereby configured such that it remains substantially rigid up to a critical magnitude of force transmitted in the longitudinal direction of said pendulum support and contracts upon the critical magnitude of force being exceeded and thus enables a relative movement of the end sections of the pendulum support toward one another.

Conceivable hereto, for example, is a telescoped structure to the pendulum support including a support housing, a force-transferring member accommodated therein, as well as a damping element likewise accommodated in the support housing as necessary, for example in the form of a spring or a so-called elastomer body. With this type of structure, the damping housing is accorded the function of longitudinal guide while the damping element accommodated in the buffer housing serves to transfer force in the longitudinal direction.

Also conceivable for the pendulum support is a structure which, for example, utilizes a hydrostatically or gas-hydraulic functioning energy-absorbing mechanism or a destructively-designed energy-absorbing mechanism. Thus, a destructive or regenerative energy-absorbing mechanism, or a combination of destructive and regenerative energy-absorbing mechanisms, can for example, be integrated into the pendulum support. Notwithstanding the above, the energy-absorbing mechanism(s) can also be designed to be a component of the pendulum support.

The return stroke of the pendulum support; i.e., the contracting of the pendulum support upon the relative movement of the end sections of said pendulum support upon the critical force being exceeded, corresponds to—when a regeneratively-functioning energy-absorbing mechanism is employed as a pendulum support or integrated into the pendulum support—the buffer stroke, i.e., the spring range of the energy-absorbing mechanism (the damping element). When a destructively-functioning energy-absorbing mechanism, for example a deformation tube, is employed as the pendulum support or integrated into the pendulum support, the return stroke of the pendulum support corresponds to the contracting of the energy-absorbing mechanism occurring due to plastic deformation. After reaching the maximum return stroke, the damping properties of the pendulum support, respectively the maximum energy absorption achievable with the pendulum support, is exhausted, in consequence of which impact forces exceeding the characteristic operative load of the pendulum support are routed to the vehicle underframe via the third bearing.

The invention is, however, not limited to pendulum supports which contract upon the exceeding of a critical amount of force. It is in principle also conceivable to employ a one-piece pendulum support in which no energy-absorbing mechanism is integrated and which does not provide for a contracting of the pendulum support upon a critical amount of force being exceeded. In this case, an energy-absorbing mechanism can be provided downstream the pendulum support, by the energy-absorbing mechanism being for example connected to the pendulum support by means of the third bearing. In such a case, the force transmitted from the bumper bar to the pendulum support is introduced as linear force into the energy-absorbing mechanism via the third bearing.

Because in accordance with the invention, the bumper bar is pivotably connected at its first end to the vehicle underframe by means of the first bearing and at its second end to the pendulum support by means of a second bearing, an impact force acting on the bumper bar is initially introduced into the pendulum support. Should the impact force introduced into the pendulum support exceed the amount of force characteristic for the contracting of the pendulum support, a pivoting of the bumper bar about a pivot axis defined by the first bearing occurs simultaneous to the contracting of the pendulum support.

As indicated above, it is conceivable for an energy-absorbing mechanism to be integrated into the pendulum support. Since impact force introduced into the pendulum support always runs in the longitudinal direction of said pendulum support, this ensures that the impact force to be dampened in the energy-absorbing mechanism is introduced axially into the energy-absorbing mechanism integrated in the pendulum support.

Alternatively or additionally to an energy-absorbing mechanism integrated in the pendulum support, it is of course also conceivable to provide an additional energy-absorbing mechanism downstream of the pendulum support if need be. The energy-dissipating mechanism can for example, be connected to the pendulum support by means of the third bearing. In such a case, the force transferred from the bumper bar to the pendulum support would be linear force introduced into the energy-absorbing mechanism via the third bearing.

The bearings used to form the tripod of the bumper bar and the pendulum support, are in each case bearings which fix the associated component (bumper bar or pendulum support) in three degrees of translational freedom. The first, second and third bearings employed in the inventive solution activate upon axial force, tangential force and vertical force, whereby these bearings each allow a rotation about at least one pivot axis. The at least one pivot axis can extend vertically (although this is not mandatory).

In order to ensure that the bumper bar will not pivot into the vehicle contour until a (critical) impact force, a preferred realization of the inventive solution provides for the pendulum support to comprise an energy-absorbing element which remains substantially rigid until a predefinable characteristic amount of force is introduced to the energy-absorbing element as linear force and thus prevent a pivoting of the bumper bar about the pivot axis defined by the first bearing. Only after the amount of force characteristic for the activation of the energy-absorbing element is exceeded does a contracting of the pendulum support occur, in consequence of which a pivoting of the bumper bar about the pivot axis defined by the first bearing is possible, whereby the torque occurring due to the pivoting of the bumper bar is introduced into the energy-absorbing element as linear force and the corresponding impact energy is at least partly absorbed or dissipated.

Various different solutions are conceivable in realizing the energy-absorbing element employed in the inventive solution. It is for example, conceivable to use a deformation tube as the energy-absorbing element since same exhibits predefinable response properties with maximum possible energy absorption. Of course, however, a regeneratively-designed component can also be used as the energy-absorbing element, for instance an energy-absorbing element based on a gas-hydraulic or hydrostatic mode of operation. A combination of a regeneratively-designed component and a destructively-designed component would also be conceivable.

So that the front or rear region of a railborne vehicle can be protected as completely as possible from severe damage, even in the case of a collision from the side, the inventive energy absorption device lends itself to being used in the front or rear region of the vehicle, wherein it is preferred for the bumper bar to exhibit a shaping which is adapted to the outer contour of the vehicle's nose cone. What this achieves is that in the event of a crash, the impact energy which ensues and which is to be absorbed by the energy absorption device is introduced as directly as possible to the bumper bar and routed to the energy-absorbing element as a linear force.

In one embodiment, two energy absorption devices are disposed in the front or rear regions of a railborne vehicle which are preferably arranged symmetrically on both sides of the front end of the vehicle and laterally distanced respectively from the vertical central longitudinal plane. This is thus, a solution which completely protects the front or rear region of the vehicle against severe damage upon side-on collisions. The bumper bar of the two energy absorption devices should thereby accordingly cover the lateral flanks of the front or rear region so as to ensure sufficient protection.

In another further development of the solution according to the invention, an additional protection against damage is provided in that the energy absorption device comprises a first energy-absorbing element integrated into the pendulum support and a second energy-absorbing element situated downstream the pendulum support, which is preferably fixed at the vehicle center and designed to respond upon a defined return stroke of the pendulum support being reached and absorb or dissipate at least a portion of the energy transferred through the first energy-absorbing element and introduced into the second energy-absorbing element as a result of an impact.

A deformation tube or a crash box lends itself particularly well as the second energy-absorbing element, same being designed to respond upon a defined return stroke of the pendulum support being reached and after the amount of force characteristic for the activation of the second energy-absorbing element being exceeded and which converts and thus, dissipates at least a portion of the energy transmitted as a result of an impact into work of deformation and heat by a defined plastic deformation. In principle, however, a regeneratively-designed energy-absorbing element or a combination of a destructively-designed and a regeneratively-designed energy-absorbing element would also be conceivable as the second energy-absorbing element.

The downstream arranging of a second energy-absorbing element described above is effected in a preferred realization of the inventive solution by the second end section of the pendulum support being connected by means of the third bearing such that upon a pivoting of the bumper bar about a pivot axis defined by the first bearing, the resulting moment of force is at least partly introduced as linear force into the at least one second energy-absorbing element via the pendulum support. It is thereby conceivable for the second energy-absorbing element to be directly or indirectly connected to the third bearing by means of a force-transferring element.

For the defined introduction of impact forces to the bumper bar, a contact surface joined to the bumper bar is preferably provided, wherein the contact surface exhibits at least one convex outer contour area. Specifically, it is advantageous for the at least one area of the contact surface to be configured as an arc, the center of which lies on a pivot axis defined by the second bearing. It is further preferred for the contact surface to include at least one area having a profile for the provision of an override guard.

One realization of the inventive solution utilizes a total of two energy absorption devices of the type described above, whereby these energy absorption devices are preferably connected to the vehicle underframe at the front or rear region of the vehicle symmetrical to the vehicle's longitudinal axis such that the bumper bar corresponds to at least part of the outer contour of the front or rear region. Doing so thus, provides a shock absorber for the front or rear region of a railborne vehicle, in particular a streetcar vehicle. Due to the laterally-arranged energy absorption devices, the respective energy absorption device can aid in at least partly absorbing or dissipating the impact energy occurring upon the vehicle crashing side-on with an obstacle.

So that a bumper bar can realize the above-described pivoting motion about a pivot axis defined by its associated first bearing with the above-described shock absorber in a side-on collision, care needs to be taken that the bumper bars of the two energy absorption devices do not obstruct one another from pivoting and that there is always a free pivoting space for both bumper bars which is respectively covered by the associated bumper bars upon the responding of the energy absorption devices. This can be particularly easily realized by, for example, leaving a clearance between the end regions of the bumper bars which are not connected to the car body by means of the first bearing.

Yet upon a frontal collision with an obstacle, there is the risk with the above-described shock absorber that objects can intrude into the clearance between the non-articulated end regions of the bumper bars. Since the bumper bars of the two energy absorption devices cannot get any purchase on these objects, they can possibly impinge unchecked upon the vehicle car body and cause substantial damage there. Therefore, a preferred further development of the above-described shock absorber provides for the clearance between the non-articulated end regions of the bumper bars to be appropriately bridged, for example with a buffer plate or a flexible element mounted between the non-articulated end regions of the bumper bars such as, for example, a cable, a belt or a chain.

If a horizontally-extending buffer plate preferably transverse to the vehicle longitudinal axis is used to bridge the clearance between the non-articulated end regions of the bumper bars, it is of advantage for a first end region of the buffer plate to be connected to the bumper bar of the first energy absorption device by means of a fourth bearing and, oppositely, a second end region of the buffer plate to the bumper bar of the second energy absorption device by means of a fifth bearing such that the impact force which occurs when an object collides for example frontally with the buffer plate, particularly the center region of the buffer plate, is transferred from the buffer plate to the two bumper bars through the end regions affixed to the respective bumper bars of the energy absorption devices and thus introduced into the two energy absorption devices of the shock absorber. Because the end regions of the buffer plate are respectively connected to the associated bumper bars by means of a bearing (fourth or fifth bearing), the buffer plate does not obstruct the pivoting movement of the bumper bars when the shock absorber is activated.

Providing a buffer plate to bridge the clearance between the non-articulated end regions of the bumper bars offers the additional advantage that also in the case of colliding sideways with an obstacle, both energy absorption devices of the shock absorber will respond, in consequence of which the shock absorber is also suited to absorb higher impact forces. The buffer plate thereby effects that upon a pivoting of one of the two bumper bars about a pivot axis defined by its associated first bearing, the other bumper bar is also concurrently pivoted about the pivot axis defined by its own associated first bearing.

As already indicated, however, it is also conceivable that instead of utilizing a buffer plate coupled to the bumper bars of the energy absorption devices by means of a bearing, an, e.g., flexible element mounted between the non-articulated end regions of the bumper bars can be employed, for example a cable, a belt or a chain. Unlike with a relatively rigid buffer plate, it is not necessary when using a flexible element for same to be coupled to the bumper bars of the energy absorption devices by means of a bearing. Instead, the respective end regions of the flexible element can be fixedly connected to the buffer plate since the element used to bridge the clearance between the non-articulated end regions of the bumper bar is flexible and thus, does not hinder the pivoting motion simultaneously realized by the bumper bars upon a frontal collision.

The providing of a flexible element to bridge the clearance between the non-articulated end regions of the bumper bar can then be of particular advantage when activation of both energy absorption devices of the shock absorber is to be prevented upon a side-on collision with an obstacle.

BRIEF DESCRIPTION OF THE DRAWINGS

The following will make reference to the accompanying drawings in describing preferred embodiments of the solution according to the invention.

DESCRIPTION OF THE INVENTION

In the following, the structuring and functioning of a shock absorber 100 provided in the front or rear region of a railborne vehicle and including a first and a second energy absorption device 10, 20, in each case in accordance with a first embodiment of the invention, will first be described by drawing reference to the illustrations provided in FIGS. 1 to 3. The shock absorber 100 is, as depicted, arranged in a front or rear region of a railborne vehicle (not explicitly shown in detail), in particular a streetcar vehicle, and serves to at least partly absorb or dissipate the impact energy occurring upon the vehicle experiencing a frontal and/or side-on collision with an obstacle.

Figure 1:
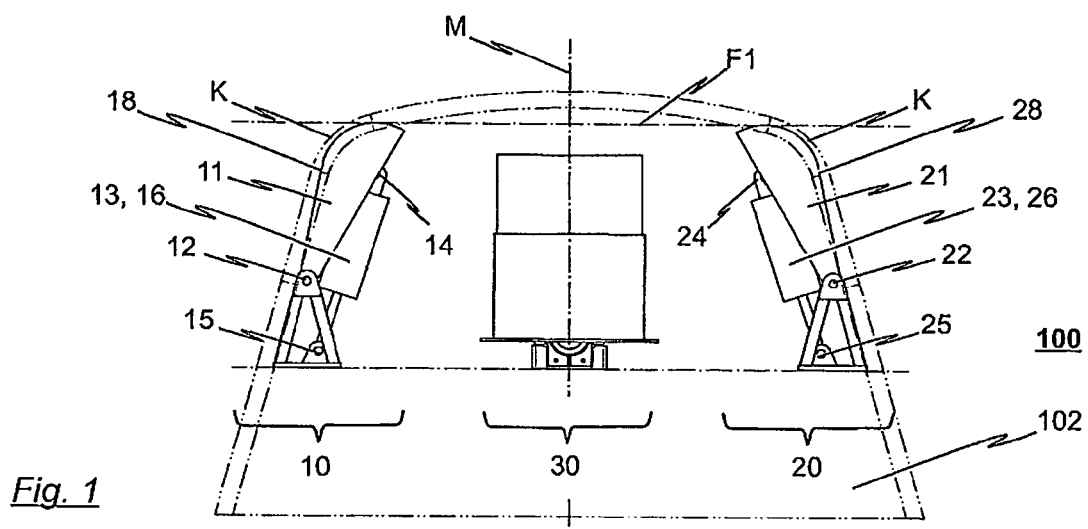
FIG. 1 shows a top plan view of a shock absorber for the front or rear region of a railborne vehicle, in particular a streetcar vehicle, including a first energy absorption device and a second energy absorption device, in each case according to a first embodiment of the invention.
Figure 2:
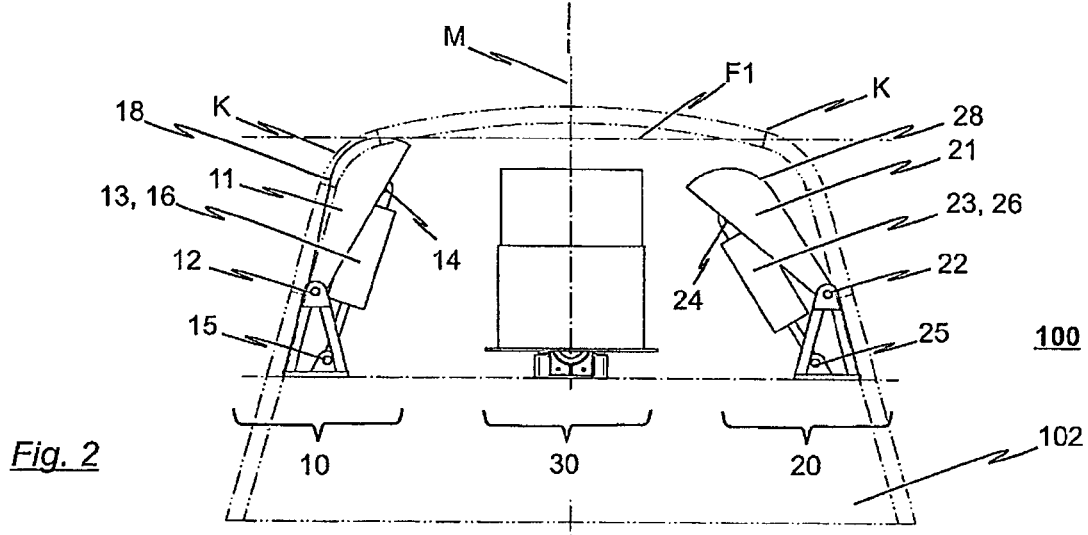
FIG. 2 shows the shock absorber shown in FIG. 1 after activation of one of the two energy absorption devices.
Figure 3:
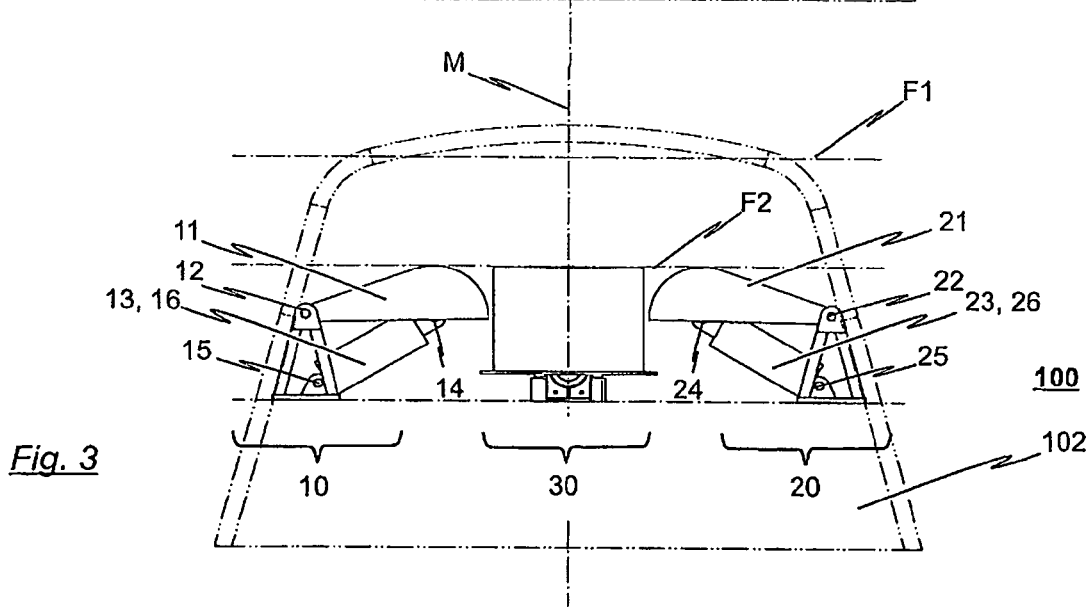
FIG. 3 shows the shock absorber shown in FIG. 1 after the total achievable energy absorption has been fully exhausted.
Figure 4:
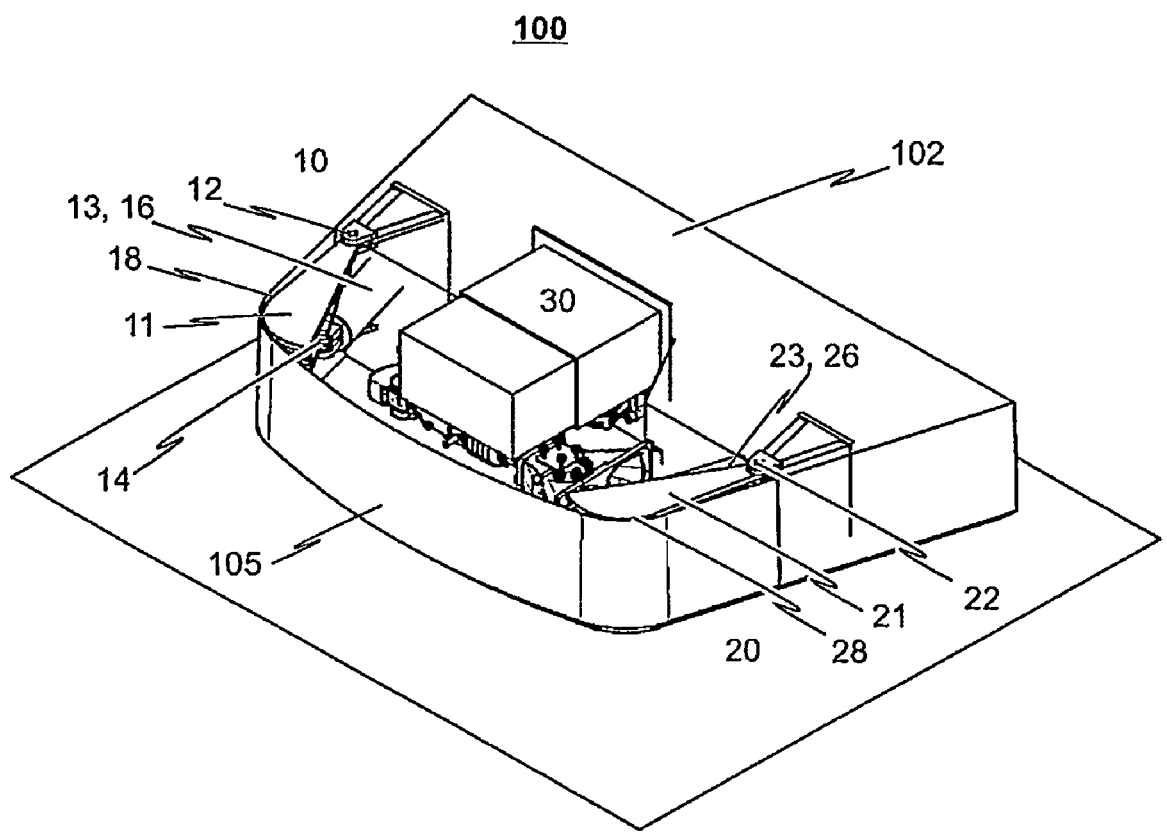
FIG. 4 shows a perspective view of a nose cone region of a vehicle provided with a shock absorber in accordance with FIG. 1.
Figure 5:
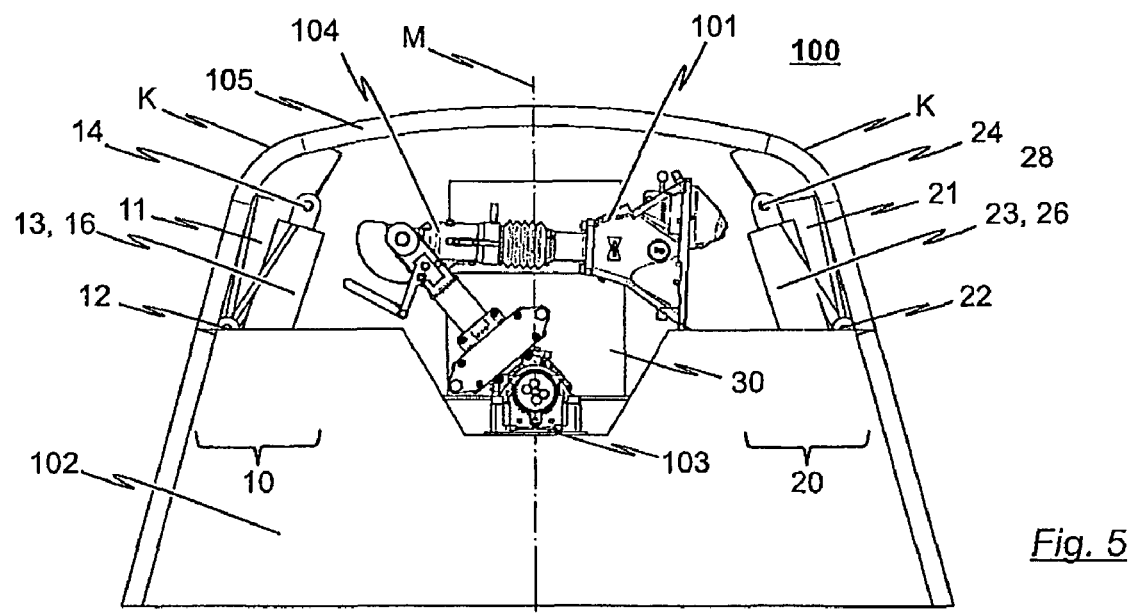
FIG. 5 shows a top plan view of the underside of the nose cone region shown in FIG. 4.
Figure 6:
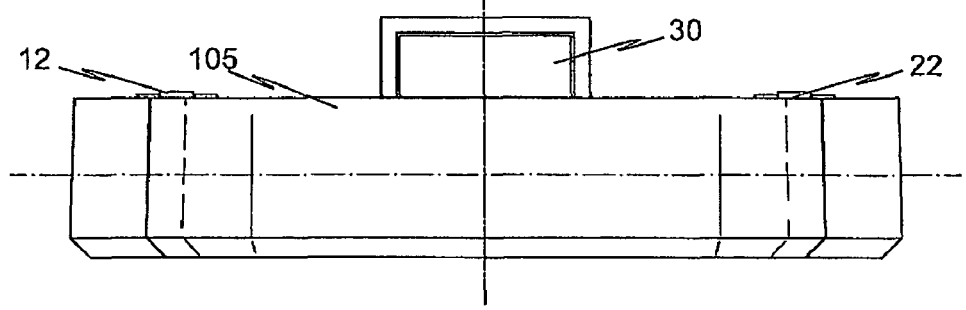
FIG. 6 shows a top plan frontal view of the nose cone region shown in FIG. 4.
Figure 7:
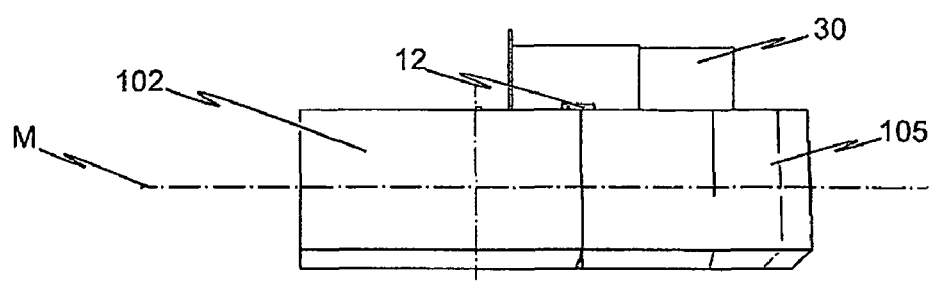
FIG. 7 shows a side view of the nose cone region shown in FIG. 4.
Figure 8:
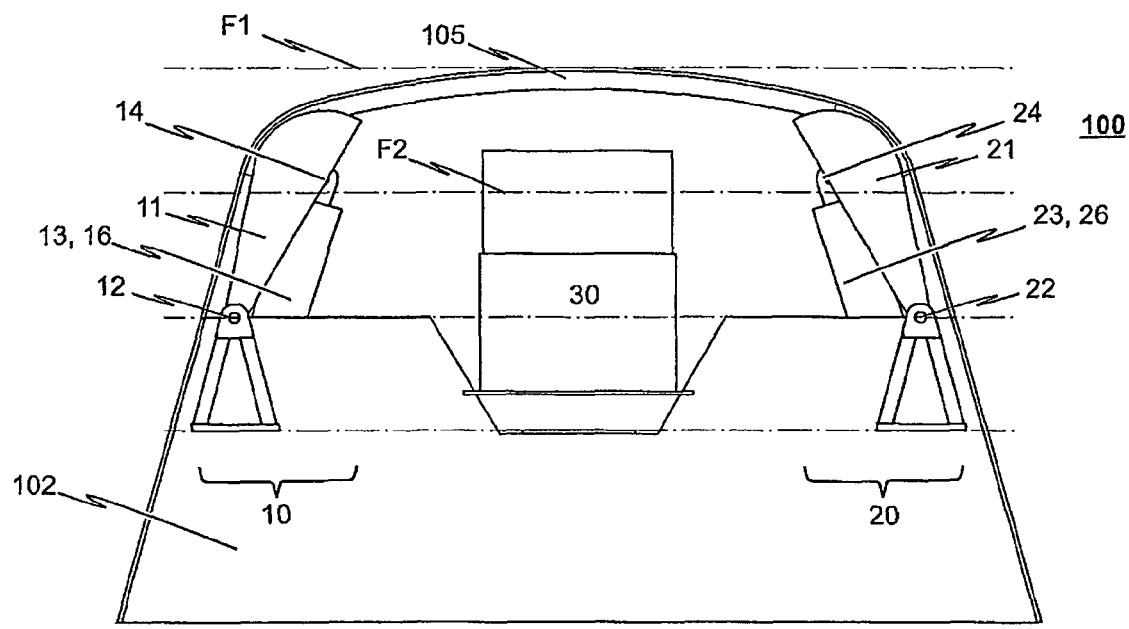
FIG. 8 shows a top plan view of the upper side of the nose cone region shown in FIG. 4.
Figure 9:
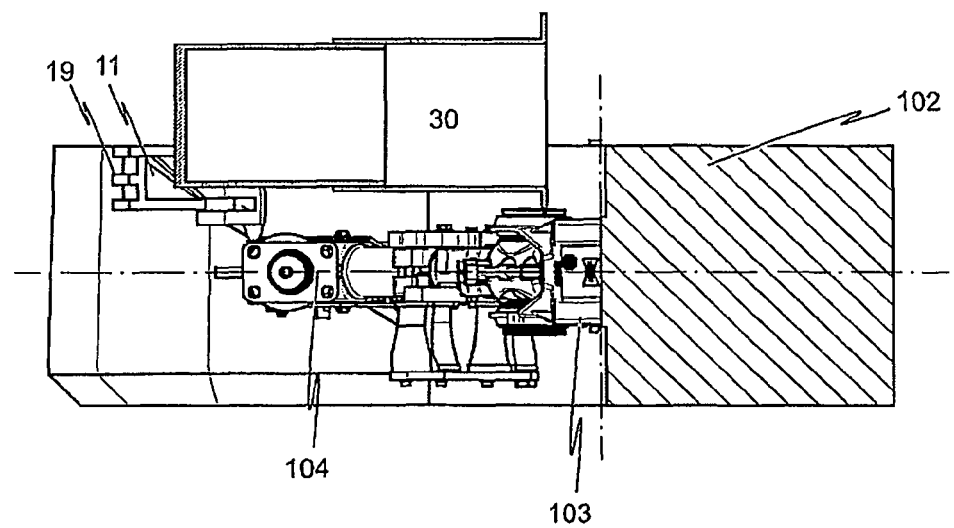
FIG. 9 shows a partly sectional side view of the nose cone region shown in FIG. 4.

The energy absorption devices 10, 20 employed in the shock absorber 100 in accordance with the illustrations of FIGS. 1 to 3 are disposed at the front end of the railborne vehicle laterally distanced from the vertical center longitudinal axis M. In detail, a symmetrical arrangement of the two energy absorption devices 10, 20 to the vertical center longitudinal axis M is provided in the depicted embodiment.

Each energy absorption device 10, 20 includes a bumper bar 11, 21, which is pivotably coupled in a horizontal plane by means of a first bearing 12, 22 to the vehicle underframe 102 of the railborne vehicle about a first pivot axis defined by the first bearing 12, 22. Additionally to this bumper bar 11, 21, each energy absorption device 10, 20 includes a pendulum support 13, 23, which is connected at its base section to the vehicle under-frame 102 by means of a third bearing 15, 25. The head section of the pendulum support 13, 23 is connected to the bumper bar 11, 21 by means of a second bearing 14, 24 such that each energy absorption device 10, 20 forms a statically defined tripod.

Figure 13:
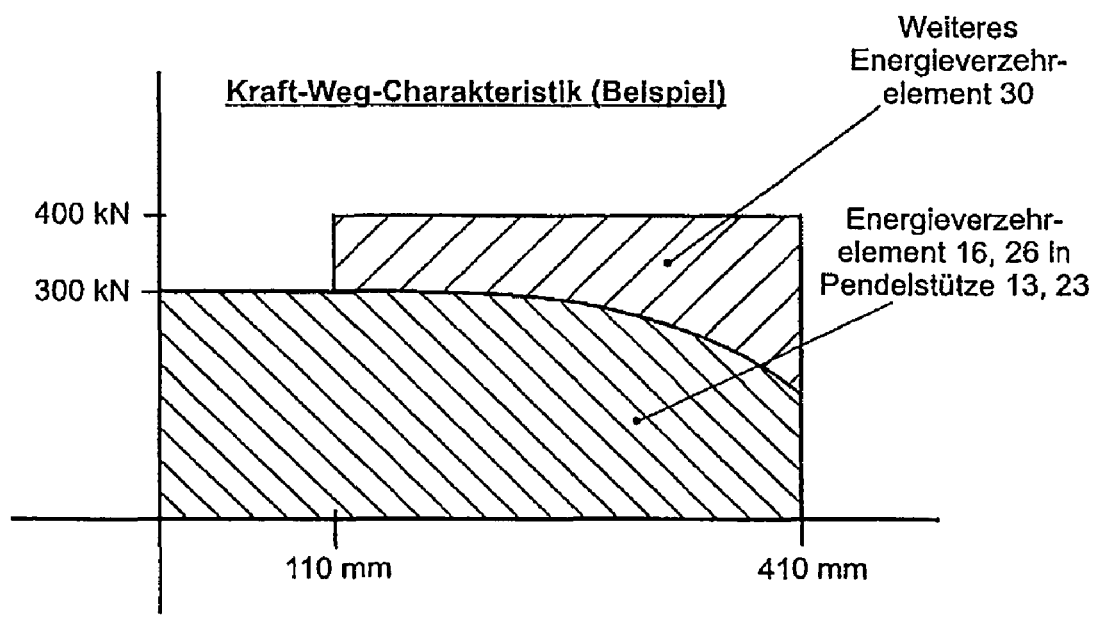
FIG. 13 shows a diagram to exemplify the force-path characteristic attainable with an energy absorption device according to one embodiment of the invention.

In the following, reference will be made to the depictions in FIGS. 1 to 3 in describing the mode of operation of the energy absorption device 10, 20. Hereby assumed with the first embodiment of said energy absorption devices 10, 20 is that a destructively-designed or regeneratively-designed energy-absorbing element 16, 26 is integrated into each respective pendulum support 13, 23. Specifically, and particularly as can be noted from the FIG. 13 representation, the first embodiment of the energy absorption device 10, 20 can employ an energy-absorbing element 16, 26 integrated into the pendulum support 13, 23 which is substantially rigid up to a predefinable characteristic amount of force introduced into said energy-absorbing element 16, 26 as linear force (for example 300 kN) and thus, prevent a pivoting of the respective bumper bar 11, 21 about a vertical pivot axis defined by the first bearing 12, 22. The energy-absorbing element 16, 26 employed in the energy absorption device 10, 20 according to the first embodiment is furthermore designed to lose its force-transferring function after the characteristic amount of force (of for example 300 kN) introduced as linear force into the energy-absorbing element 16, 26 has been exceeded and allow a pivoting of the bumper bar 11, 21 about a vertical pivot axis defined by the first bearing 12, 22 simultaneous to the absorbing of energy.

By the bumper bar 11, 21 pivoting about a pivot axis defined by the first bearing 12, 22 upon the characteristic activation force of the energy-absorbing element 16, 26 integrated in the pendulum support 13, 23 being exceeded, a pivoting of the bumper bar 11, 21 follows in the direction of the front end of the railborne vehicle (cf. FIG. 2—energy absorption device 20). In detail, prior to the activation of the energy-absorbing element 16, 26 integrated in the pendulum support 13, 23, the bumper bar 11, 21 is in a pivoted state in which the contact surfaces 18, 28 of the bumper bar 11, 21 match the outer contour K of the front or rear region of the railborne vehicle (cf. FIG. 1).

Specifically, it can be seen from the representation according to FIG. 1 that prior to the activation of the energy-absorbing element 16, 26 integrated into the pendulum support 13, 23, the bumper bar 11, 21 is in a pivoted state in which the outermost point of the side of the bumper bar 11, 21 opposite the railborne vehicle lies in a first vertically-extending plane F1.

After the energy-absorbing element 16, 26 integrated in the pendulum support 13, 23 has been activated, the bumper bar 11, 21 moves—due to the pivoting about the pivot axis defined by the first bearing 12, 22—toward the front end of the vehicle relative said front end of the railborne vehicle.

After the total energy absorption achievable with the energy-absorbing element 16, 26 integrated in the pendulum support 13, 23 has been exhausted (cf. FIG. 3), the outermost point of the side of the bumper bar 11, 21 opposite the railborne vehicle lies in a second plane F2 within the nose cone contour K of the front or rear region of the railborne vehicle indicated by the dashed lines in FIGS. 1 to 3.

Additionally to the energy-absorbing elements 16, 26 integrated in pendulum support 13, 23, the shock absorber 100 depicted in FIGS. 1 to 3 includes a further energy-absorbing element 30, affixed centrally at the front end of the railborne vehicle. This further energy-absorbing element 30 is designed to respond upon the exceeding of a predefined characteristic amount of force being transferred axially through the energy-absorbing element 30 upon an impact and absorb or dissipate at least a portion of the energy transferred through the additional energy-absorbing element 30 due to the impact. As can be seen from the force-path characteristic shown in FIG. 13, the characteristic activation force for the activation of the additional energy-absorbing element 30 is, for example, 400 kN.

In detail, the additional energy-absorbing element 30 can be configured as a deformation tube and be designed to respond upon the characteristic amount of force for activating the further energy-absorbing element 30 being exceeded (e.g., 400 kN) and convert and thus dissipate at least a portion of the energy transmitted through the additional energy-absorbing element 30 as a result of an impact into work of deformation and heat by a defined plastic deformation of the deformation tube.

The force-path characteristic depicted in FIG. 13 for the shock absorber 100 shown in FIGS. 1 to 3 clarifies that the characteristic activation force for activation of the energy-absorbing elements 16, 26 integrated in pendulum support 13, 23 and the characteristic activation force for activation of the additional energy-absorbing element 30 can differ. It can moreover be noted from the FIG. 13 representation that the additional energy-absorbing element 30 is situated downstream the energy-absorbing elements 16, 26 integrated in the pendulum support 13, 23 such that when the railborne vehicle collides with an obstacle or the like, at first only the energy-absorbing elements 16, 26 integrated in pendulum support 13, 23 will respond and that the additional energy-absorbing element 30 will not respond until after a definable amount of energy has been absorbed by the energy-absorbing elements 16, 26 integrated in the pendulum support 13, 23.

A downstream activating of the additional energy-absorbing element 30 can be realized by having the side of the additional energy-absorbing element 30 opposite the front end of the railborne vehicle be situated in a plane arranged between the first plane F1 and the second plane F2 prior to the activation of the additional energy-absorbing element 30.

Thus, the additional energy-absorbing element 30 will not be activated until the bumper bar 11, 21 of energy absorption device 10, 20 pivots from the starting position pursuant FIG. 1 (first plane F1) to the plane in which the side of the additional energy-absorbing element 30 opposite the railborne vehicle lies prior to said additional energy-absorbing element 30 being activated.

After exhausting of the total energy absorption achievable with shock absorber 100, the side of the additional energy-absorbing element 30 opposite the railborne vehicle then lies, as can particularly be seen from the FIG. 3 representation, in the same plane F2 as the point of the bumper bar 11, 21 farthest removed from the front end of said railborne vehicle.

FIGS. 4 to 8 show different views of the front or rear region of the railborne vehicle making use of a shock absorber 100 in accordance with the representations of FIGS. 1 to 3. As depicted, a central buffer coupling 101 is provided in the front or rear region of the railborne vehicle additionally to the shock absorber 100 described above. Said central buffer coupling 101 comprises a retractable coupling shank 104 and is flange-mounted to the front end of the railborne vehicle by a bearing support 103. The central buffer coupling 101, which is shown in the accompanying drawings in a collapsed or retracted state, is situated underneath the individual components of the shock absorber 100 in the embodiment as depicted. When the central buffer coupling 101 needs to brought into its coupling-ready position, the front end 105 of the front or rear region opens accordingly and the central buffer coupling 101 is extended.

Figure 10:
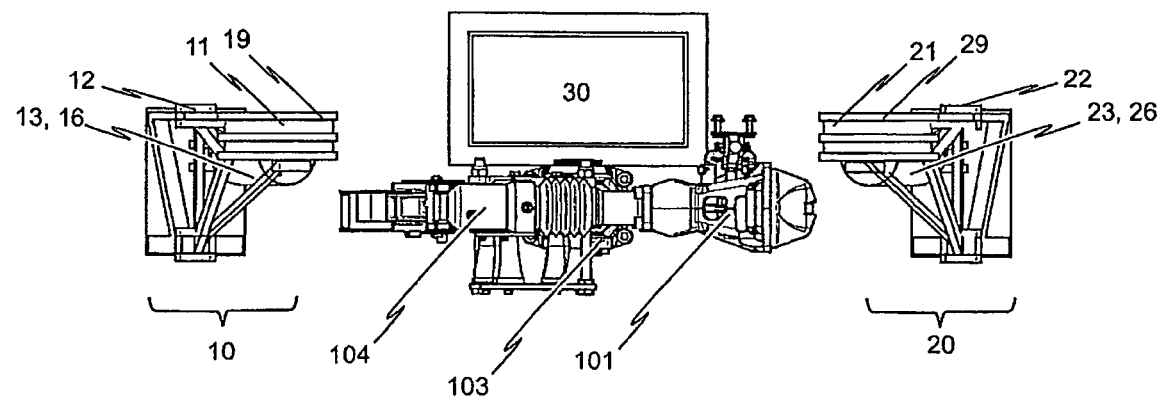
FIG. 10 shows a frontal view of the individual components accommodated in the nose cone region shown in FIG. 4.
Figure 11:
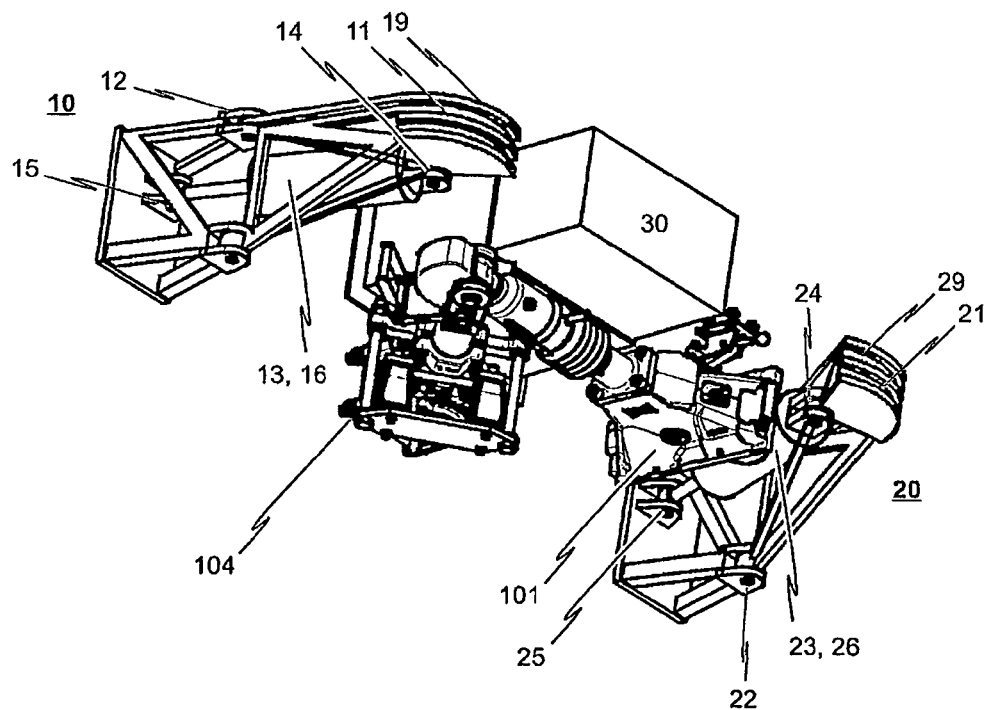
FIG. 11 shows a perspective view of the individual components accommodated in the nose cone region in accordance with FIG. 4.
Figure 12:
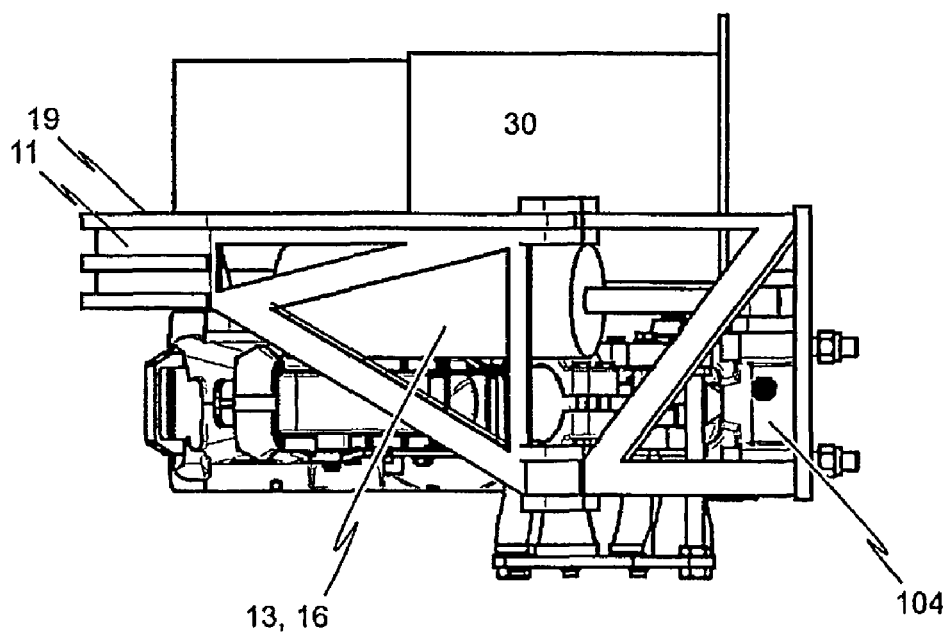
FIG. 12 shows a side view of the individual components accommodated in the nose cone region shown in FIG. 4.

FIGS. 10 to 12 again depict the individual components provided in the front or rear region in different views. Particularly seen from the representations of FIGS. 10 to 12 is that the respective contact surfaces 18, 28 of bumper bar 11, 21 can comprise at least one area 19, 29 having a profile ready for the provision of an override guard.

Figure 14A:
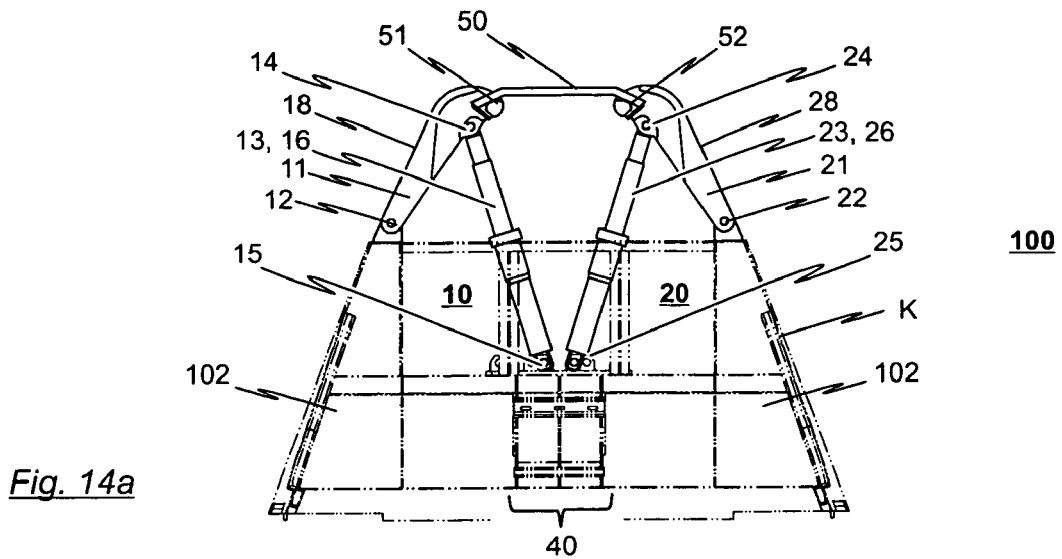
FIGS. 14a and 14b show a top plan view of a shock absorber disposed in the front or rear region of a railborne vehicle during the normal operation of the vehicle, wherein two energy absorption devices are employed in the shock absorber in accordance with a second embodiment of the invention.
Figure 15A:
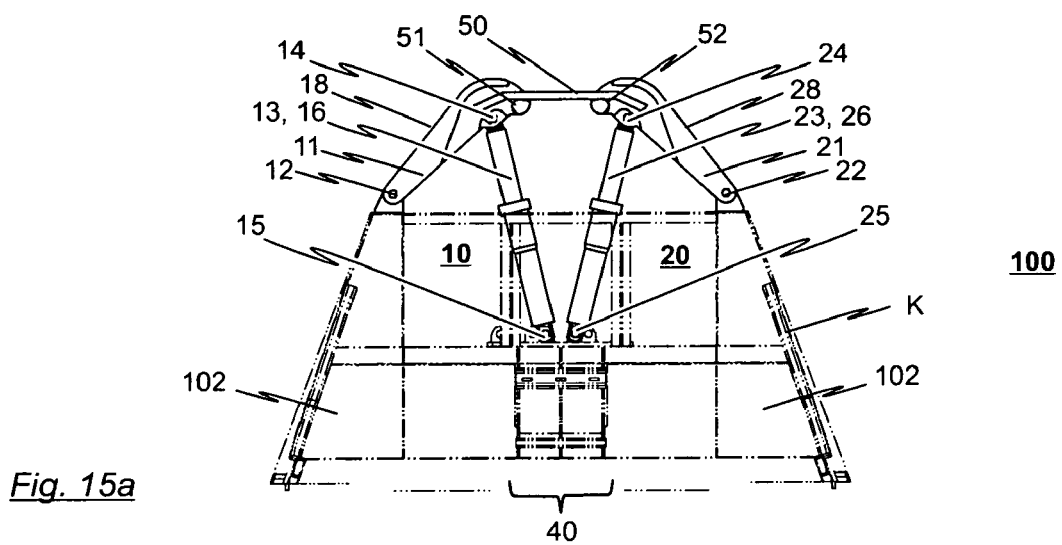
FIGS. 15a and 15b shows show the shock absorber shown in FIGS. 14a and 14b upon the introduction of impact energy as occurs during a minor crash.
Figure 16A:
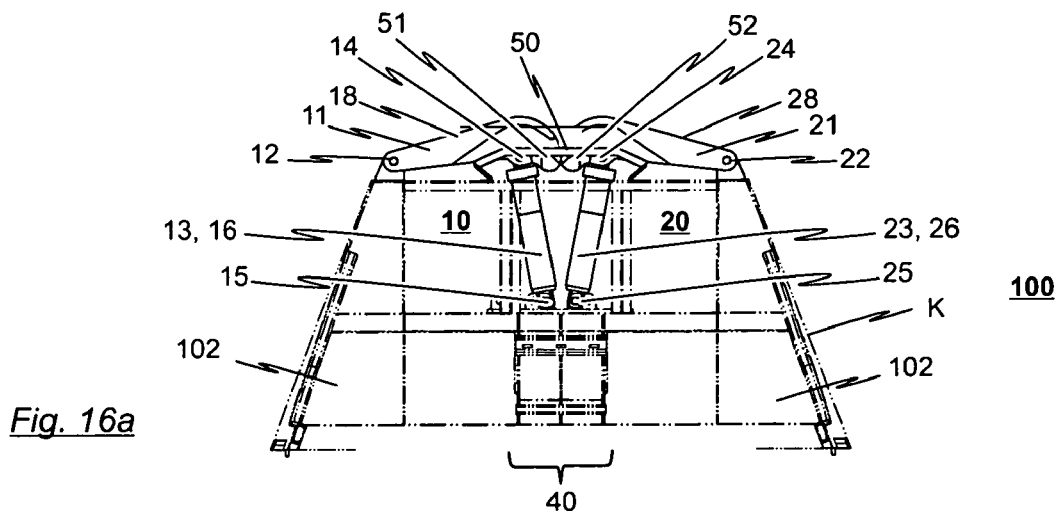
FIGS. 16a and 16b show the shock absorber depicted in FIGS. 14a and 14b upon the introduction of impact energy as occurs during a severe crash, respectively after the total achievable energy absorption has been fully exhausted.
Figure 14B:
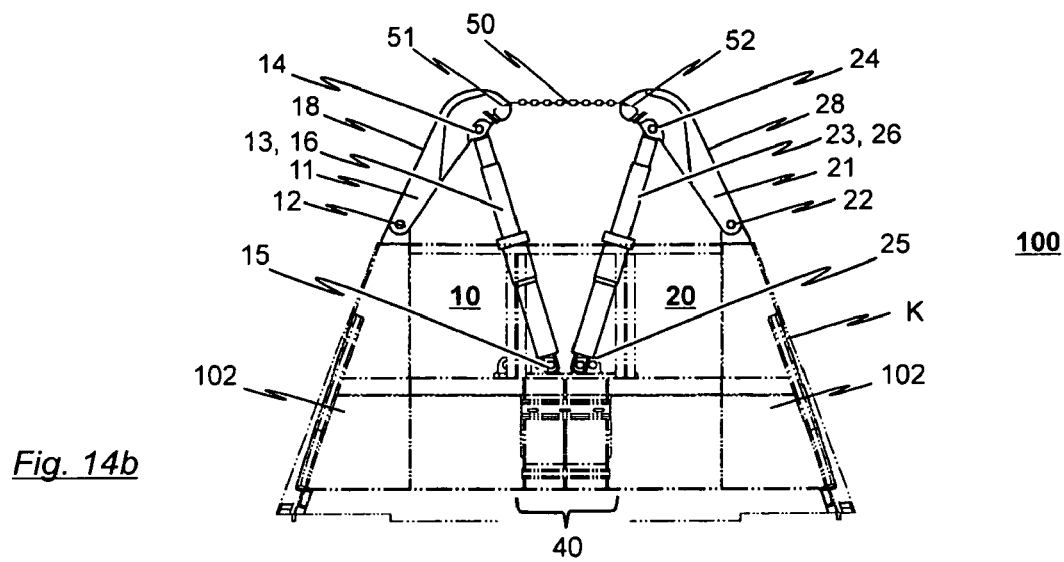
Figure 15B:
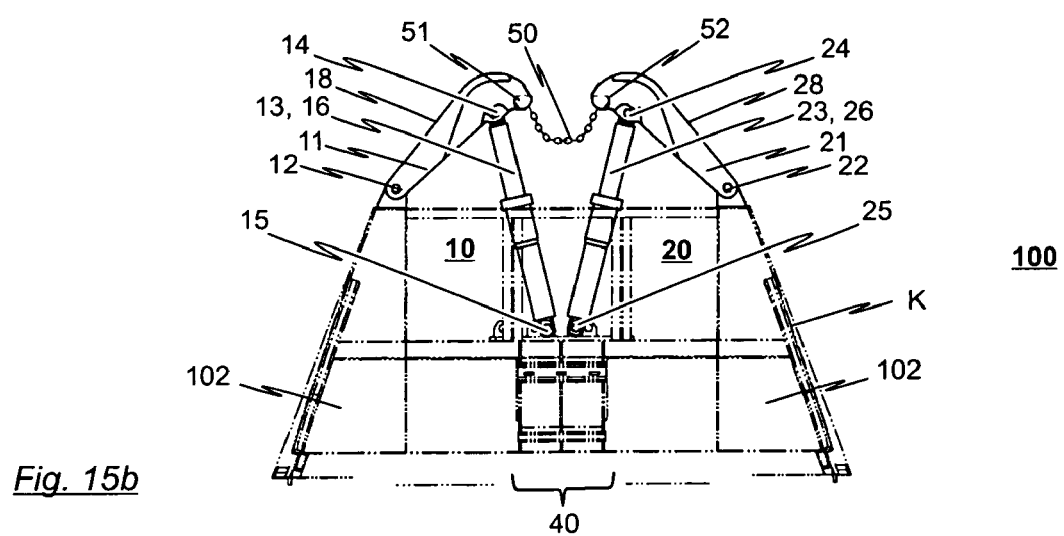
Figure 16B:
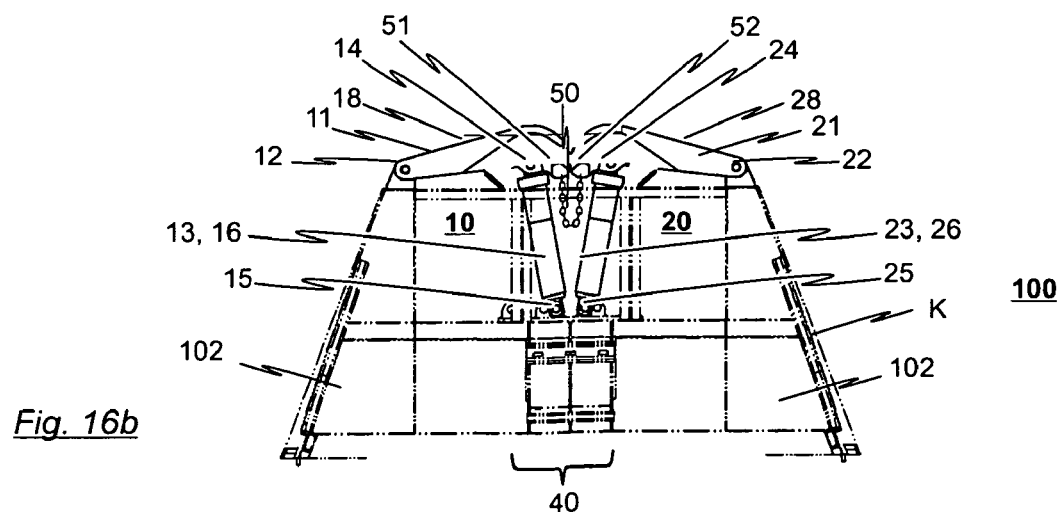

The following will make reference to the representations of FIGS. 14a to 16b in describing a further embodiment of a shock absorber 100 disposed in a front or rear region of a railborne vehicle which comprises two energy absorption devices 10, 20 according to a further embodiment of the invention. In detail, FIGS. 14a and 14b depicts depict a top plan view of a shock absorber 100 disposed in the front or rear region of a railborne vehicle during the normal operation of the vehicle. FIGS. 15a and 15b shows show the shock absorber 100 depicted in FIGS. 14a and 14b upon the introduction of impact energy as occurs during a minor crash, while FIGS. 16a and 16b show a state of the shock absorber 100 after the introduction of impact energy as occurs upon a severe crash, respectively after fully exhausting the total achievable energy absorption.

As with the shock absorber 100 described with reference to the FIGS. 1 to 3 representations, the shock absorber 100 depicted in FIGS. 14a to 16b also includes two energy absorption devices 10, 20, which are connected to the vehicle underframe 102 symmetrical to the vehicle longitudinal axis in the front or rear region of the vehicle such that at least part of the bumper bar 11, 21 corresponds to the outer contour K of the front or rear region. Each energy absorption device 10, 20 includes a bumper bar 11, 21 which is pivotably connected to the vehicle underframe 102 by means of a first bearing 12, 22. A pendulum support 13, 23 having a first and second end section (head and base section) is further provided. Each pendulum support 13, 23 is connected by its first end section to the bumper bar 11, 21 by means of a second bearing 14, 24 and by its second end section to the vehicle underframe 102 by means of a third bearing 15, 25. By doing so, the bumper bar 11, 21 and the pendulum support 13, 23 form a tripod.

Each pendulum support 13, 23 is designed to remain substantially rigid up to a critical amount of force transmitted in a longitudinal direction of the pendulum support 13 and not to contract until the critical amount of force is exceeded and thereby enable a movement of the end sections of the pendulum support 13, 23 relative one another. This critical amount of force is predefinable or predefined.

In detail, a telescoped structure is employed for the pendulum support 13, 23 in the embodiment depicted in FIGS. 14a to 16b, which includes a support housing, a force-transferring member accommodated therein, as well as a energy-absorbing element 16, 26 accommodated in the support housing. Because each bumper bar 11, 21 is pivotably connected at its first end to the vehicle underframe 102 by means of the first bearing 12, 22 and at its second end to the pendulum support 13, 23 by means of a second bearing 14, 24, an impact force acting on the bumper bar 11, 21 is first introduced to the pendulum support 13, 23. When the impact force introduced to the pendulum support 13, 23 exceeds the characteristic activation force for activation of the energy-absorbing elements 16, 26 integrated in said pendulum support 13, 23, and thus, the amount of force for the contracting of said pendulum support 13, 23, a pivoting of the bumper bar 11, 21 about a pivot axis defined by the first bearing 12, 22 occurs simultaneous to a contracting of said pendulum support 13, 23. Since this sequence of motion results in the impact force introduced into the pendulum support 13, 23 always running in the longitudinal direction of said pendulum support 13, 23, this ensures that the impact force will be introduced axially into the energy-absorbing element 16, 26 integrated in said pendulum support 13, 23.

FIGS. 14a to 14b shows show a state in which the energy-absorbing element 16, 26 integrated in the pendulum support 13, 23 is not yet activated. In this state, the contact surfaces 18, 28 of bumper bar 11, 21 correspond at least in part to the outer contour K of the front or rear region of the railborne vehicle.

FIGS. 15a and 15b show a state subsequent activation of the energy-absorbing elements 16, 26 integrated in the pendulum support 13, 23. As depicted, a contracting of the pendulum support 13, 23 has already occurred, and thus, a certain pivoting movement of the bumper bar 11, 21 about the vertical pivot axis defined by the first bearing 12, 22. After the maximum return stroke of the pendulum support 13, 23 has been exhausted (cf. FIGS. 16a and 16b), the maximum absorption of energy achieved by the energy-absorbing elements 16, 26 integrated in the pendulum support 13, 23 is exhausted. In order to avoid the state depicted in FIGS. 16a and 16b, that impact forces exceeding the characteristic operative load of the pendulum support 13, 23 are transferred Without being cushioned to the vehicle underframe 102 via the third bearing 15, 25, a further energy-absorbing element 40 is provided between the third bearing 15, 25 and the vehicle underframe 102. In the state depicted in FIGS. 16a and 16b, the force transferred from the bumper bars 11, 21 to the pendulum support 13, 23 is introduced into the additional energy-absorbing element 40 by means of said third bearing 15, 25 as linear force.

In the embodiment of the shock absorber 100 depicted in FIGS. 14a to 16b, a buffer plate or flexible element 50 is further employed, which is connected to the bumper bar 11 of the first energy absorption device 10 by means of a fourth bearing 51 and to the bumper bar 21 of the second energy absorption device 20 by means of a fifth bearing 52 such that when one of the two bumper bars 11, 22 is pivoted about the pivot axis defined by its respectively associated first bearing 12, 22, the other bumper bar 21, 11 is simultaneously pivoted therewith about the pivot axis defined by its respectively associated first bearing 22, 12.

To briefly summarize, the invention proposes a shock absorber 100 including a first energy absorption device 10 and a second energy absorption device 20, preferably connected to the vehicle underframe 102 at the front or rear region of the vehicle symmetrical to the vehicle longitudinal axis M. Both of the two energy absorption devices 10, 20 comprise a bumper bar 11, 21 pivotable about a vertical axis coupled laterally to the vehicle underframe 102 and respectively supported on the vehicle underframe 102 by means of a pendulum support 13, 23. The combination of bumper bar 11, 21 and pendulum support 13, 23 forms a statically defined tripod. Upon a crash, the pendulum supports 13, 23 of the energy absorption devices 10, 20 contract by a defined expenditure of force and a pivoting of the bumper bars 11, 12 to the front end of the railborne vehicle occurs. The expenditure of energy necessary for the pivoting motion is drawn from the kinetic energy of the collision. By virtue of the specific arrangement of the two energy absorption devices 10, 20, each bumper bar 11, 21 is capable of absorbing significant vertical forces and can therefore also be used as an override guard.

As can be seen in the embodiment depicted in FIGS. 14*a* to 16*b*, the design-contingent clearance between the two bumper bars 11, 21 of energy absorption devices 10, 20 can be closed by the previously-mentioned buffer plate 50 which is arranged such that it does not prevent the pivoting motion of the bumper bars 11, 21, although impact forces which act on this area are routed to the two bumper bars 11, 21, thus, utilizing the energy-absorbing elements 16, 26 of the energy absorption device 10, 20.

A mechanism for energy absorption is preferably provided in both of the two pendulum supports 13, 23 of the shock absorber 100 (energy-absorbing elements 16, 26), whereby depending on the desired application, various different reversible and irreversible systems as well as combinations thereof can be used. Accommodating an energy-absorbing element 16, 26 in a pendulum support 13, 23 offers the advantage that solely longitudinal forces and no bending moments whatsoever need to be transferred. Thus, all systems known in the construction of central buffer couplings can be used. In particular, to fulfill the requirements of EN 15227, it can make sense to gradually or incrementally change the reaction force of the energy-absorbing mechanisms to the given lift.

The sequence of events to the energy absorption is essential for the optimum design of the shock absorber 100. By virtue of the spatial arrangement of the bumper bars 11, 21 and pendulum supports 13, 23, and the geometrical change upon buffer intake, the external characteristic of the bumper bar 11, 21 is different than the internal characteristic of the energy-absorbing system in the pendulum support 13, 23. When force is introduced at an angle; i.e., upon an oblique collision, where usually only the collision-side energy absorption device 10, 20 would be activated, the external characteristic likewise changes. With the solution according to the invention, however, the statically-defined system can be highly analytically specified and calculated.

In order to design the load transfer such that the calculations will be applicable, the front end of the respective bumper bar 11, 21 is preferably configured as a circular arc, its center point lying on a pivot axis defined by the second bearing 14, 24. This thus, ensures that an external load will act radially on this articulation point and no uncalculated bending moment can be triggered in bumper bar 11, 21. The round outer contour to bumper bar 11, 21 ensures in the event of a collision between two equal vehicles that the bumper bars 11, 21 turn over one another with buffer intake and thus the extending forces can scarcely be distorted by additional friction.

As indicated above, the inventive arrangement of the energy absorption device 10, 20 permits the bumper bar 11, 21 to be able to absorb significant vertical forces so that same can also be used as an override guard. It is specifically preferred hereto to respectively provide the contact surfaces 18, 28 of the bumper bar 11, 21 with the applicable override guard profile 19, 29. This profile 19, 29 in no way hinders the previously-described properties of the round outer contour to the bumper bar 11, 21.

It is in principle conceivable to arrange a buffer plate 50 between the bumper bars 11, 21 which prevents narrow, hard objects from intruding into the vehicle from between the bumper bars 11, 21. The buffer plate 50 is preferably seated in the two bumper bars 11, 21 by means of bearings 51, 52 such that it is fixed without play in the initial position. Upon buffer intake to one or both of the bumper bars 11, 21, the buffer plate 50 then slides into the corresponding recess within said bumper bars 11, 21. It is hereby irrelevant whether the force inducing the buffer intake acts on the bumper bars 11, 21 or the buffer plate 50.

The pendulum support 13, 23 functions in principle exactly the same as a conventional coupling rod. Accordingly, energy-absorbing elements of known design can be used: steel or rubber springs are just as conceivable as reversible elements as are hydraulic or hydrostatic buffers. While deformation tubes are preferable as irreversible energy-absorbing elements, using deformable material such as metal foam or honeycomb is just as conceivable as collapsible or roller tubes or fracturing or severing solutions. Since a two-stage or multistage characteristic can be advantageous in order to cover different crash scenarios, a combination of a buffer and one or two deformation tubes is the most likely.

Therefore, the invention relates to a shock absorber 100 for impact-driven vehicles mounted or mountable on the vehicle structure which, in the event of collision, permits the dissipation of kinetic energy by a controlled, reversible or irreversible yielding of contact surfaces 18, 28 at a defined force. By appropriately setting the characteristic for the energy-absorbing elements 16, 26, 30, 40 as employed, the invention allows for an adapting to the respective vehicle specification. In particular, the shock absorber 100 also works at different impact angles; i.e., oblique impacts.

The energy absorption device 10, 20 according to the invention is a statically defined system which is analytically calculable and resilient to vertical forces. As such, the system can also be used as an override guard.

The invention is not limited to the embodiments as described above. In particular, it is conceivable to utilize more or fewer than two bumper bars 20 in the shock absorber 100. Nor do the pivot axes defined by bearings 11, 14, 15, 21, 24, 25 necessarily need to extend vertically. It is furthermore, not mandatory for the bumper bars 11, 21 to be articulated to the outside of vehicle structure K. Should, however, the bumper bars 11, 21 be articulated within vehicle structure K, this may hinder the functioning of the shock absorber 100 in the event of an oblique collision.

Similarly, the contact surfaces 18, 28 do not necessarily need to be circular. However, the above-described circular design is of advantage in terms of rolling motion and defined load transfer.

The present description works from the assumption that the contact surfaces 18, 28 are an integral part of the bumper bars 11, 21. However, it is also conceivable that the con-tact surfaces 18, 28 be joined to the underframe 102 in a form of a quadruple joint with two articulations (with torque support as in a double wishbone suspension plus guidance or a multi-link independent suspension). The remaining degree of freedom is then absorbed by a pendulum support 13, 23 as described. The contact surfaces 18, 28 then move like the side of a parallelogram. Should two equal vehicles crash into one another, there will be no relative movement between the contact surfaces 18, 28.

In order to bridge the open space between the two bumper bars 11, 21, it is possible—as described above—to use a buffer plate 50. The open space between the bumper bars 11, 21 can however also be closed by an asymmetrical design to the bumper bars 11, 21 on both sides so that they can overlap in or over engagement with one another.

In the same way, it is also possible to replace the buffer plate 50 with two shorter buffer plates connected together and to respective bumper bar 11, 21 by a total of three articulations. A narrow object would then pull the bumper bars inward so that the absorption of energy would be large.

The embodiment depicted with reference to the illustrations in FIGS. 14*a* to 16*b* makes use of a serial arrangement for the load stages. Conversely hereto, it is conceivable to provide—as described above with reference to the illustrations according to FIGS. 1 to 3—a parallel arrangement in which the second or additional load stages are not activated until after the first load stage has covered a certain lift. As explained above, the additional load stage is affixed separately to the underframe 102 of the vehicle and is either activated by the moving parts of the bumper bar system or completely separated by the impact object. The bumper bars continue to work concurrently so that the responsive forces of all parallel-working systems are summated.

The invention is in principle not limited to the embodiments in which energy-absorbing elements 16, 26 are integrated or incorporated in pendulum support 13, 23. Configuring the pendulum support 13, 23 without energy-absorbing elements is also conceivable, whereby the bumper bars 11, 21 would then be rigid and serve as defined force introduction points or connection points for other shock absorbers and/or override guides. It would also be possible to not equip pendulum support 13, 23 with energy-absorbing elements, although articulated at its base points to an energy-absorbing structure (energy-absorbing element 40). The pendulum supports 13, 23 would then serve to transfer the force while the actual energy-absorbing elements 40 are arranged elsewhere. It is in particular conceivable for the pendulum support 13, 23 to be articulated at its base points to a common energy-absorbing structure (energy-absorbing element 40) so that both bumper bars 11, 21 are necessarily moved together, even if only one is subjected to an impact force.

The invention claimed is:

1. An energy absorption device for a railborne vehicle, including a streetcar vehicle, which is operative to absorb or dissipate at least a portion of an impact energy resulting from the vehicle impacting an obstacle, comprising:
    a bumper bar pivotably connected to a vehicle under-frame by a first bearing, the first bearing defining a pivot axis and being fixedly mounted to the vehicle under-frame such that there is no relative movement between the first bearing, including the pivot axis, and the vehicle under-frame;
    a pendulum support having a first and a second end section which is connected at the first end section to the bumper bar by a second bearing, and at the second end section with the vehicle under-frame by a third bearing such that the bumper bar and the pendulum support form a tripod; and
    an energy-absorbing mechanism operative and disposed such that upon the bumper bar pivoting about the pivot axis defined by the first bearing, the resultant moment of force is introduced as linear force into the energy-absorbing mechanism and at least partly absorbed or dissipated there.

2. The energy absorption device according to claim 1, wherein the energy-absorbing mechanism comprises at least one first energy-absorbing element which is integrated into the pendulum support such that upon the bumper bar pivoting about a pivot axis defined by the first bearing, a resultant moment of force is introduced as linear force into the at least one energy-absorbing mechanism.

3. The energy absorption device according to claim 2, wherein the at least one first energy-absorbing mechanism is designed to be essentially rigid when a force of up to a predefinable characteristic amount is introduced into said first energy-absorbing mechanism and prevents a pivoting movement of the bumper bar about a pivot axis defined by the first bearing, and
    wherein the at least one first energy-absorbing mechanism is further designed and integrated in the pendulum support such that a longitudinal contracting of the pendulum support occurs upon an exceeding of the characteristic amount of force and that the at least one first energy-absorbing mechanism permits a pivoting movement of the bumper bar about the pivot axis simultaneous to the absorbing of energy as needed.

4. The energy absorption device according to claim 2, wherein the at least one first energy-absorbing mechanism is designed as a destructively-designed deformation element having a predefinable response characteristic.

5. The energy absorption device according to claim 2, wherein the at least one first energy-absorbing element is designed so as to be regenerative and having a predefinable response characteristic.

6. The energy absorption device according to claim 1, wherein the energy-absorbing mechanism comprises at least one second energy-absorbing element connectable to the vehicle under frame with which the second end section of the pendulum support is connected by the third bearing such that upon a pivoting of the bumper bar about a pivot axis defined by the first bearing, the resulting moment of force is at least partly introduced as linear force into the at least one second energy-absorbing element via the pendulum support.

7. The energy absorption device according to claim 1, wherein the energy-absorbing mechanism comprises at least one third energy-absorbing element connected to the third bearing by a force-transferring element.

8. The energy absorption device according to claim 1, which further comprises a contact surface joined to the bumper bar to introduce impact forces to said bumper bar, wherein said contact surface comprises at least one area of convex outer contour.

9. The energy absorption device according to claim 8, wherein the at least one area of the contact surface is configured as an arc, a center of which lies on a pivot axis defined by the second bearing.

10. The energy absorption device according to claim 8, wherein the contact surface comprises at least one area having a profile for a provision of an override guard.

11. A shock absorber for the front or rear region of a railborne vehicle, including a streetcar vehicle, comprising:
    a first and a second energy-absorbing device, each including:
        a bumper bar pivotably connected to a vehicle under-frame by a first bearing, the first bearing defining a pivot axis and being fixedly mounted to the vehicle under-frame such that there is no relative movement between the first bearing, including the pivot axis, and the vehicle under-frame;

a pendulum support having a first and a second end section which is connected at the first end section to the bumper bar by a second bearing, and at the second end section with the vehicle under-frame by a third bearing such that the bumper bar and the pendulum support form a tripod; and an energy-absorbing mechanism designed and disposed such that upon the bumper bar pivoting about the pivot axis defined by the first bearing, the resultant moment of force is introduced as linear force into the energy-absorbing mechanism and at least partly absorbed or dissipated there;

wherein the energy-absorbing devices are connected to the vehicle under-frame at the front or rear region of the vehicle symmetrical to a vehicle longitudinal axis (L) such that the bumper bars correspond to at least part of an outer contour (K) of the front or rear region.

12. The shock absorber according to claim 11, wherein the bumper bars are designed such that there is a clearance between the end regions of said bumper bars associated with the first bearing, and wherein a mechanism is further provided which is connected to the two bumper bars and bridges a clearance between non-articulated end regions of said bumper bars.

13. The shock absorber according to claim 12, wherein the mechanism comprises:

a buffer plate connected to the bumper bar of the first energy absorption device by a fourth bearing and to the bumper bar of the second energy absorption device by a fifth bearing such that an impact force which occurs when an object collides frontally with the buffer plate is transferred from the buffer plate to the two bumper bars through the end regions affixed to the respective bumper bars and introduced into the two energy absorption devices.

14. The shock absorber according to claim 12, wherein the mechanism comprises:

a flexible element provided between the non-articulated end regions of the bumper bar, including one of a cable, a belt or a chain, which is fixedly connected both to the first bumper bar as well as to the second bumper bar in order to bridge a clearance between the non-articulated end regions of said bumper bars.

15. The shock absorber according to claim 11, wherein the second end sections of the pendulum supports of the two energy absorption devices are connected to a common energy-absorbing element.

16. A shock absorber for the front or rear region of a railborne vehicle, including a streetcar vehicle, comprising:

a first and a second energy-absorbing device, including:

a bumper bar pivotably connectable to a vehicle under-frame by a first bearing;

a pendulum support having a first and a second end section which is connected at the first end section to the bumper bar by a second bearing, and at the second end section with the vehicle under-frame by a third bearing such that the bumper bar and the pendulum support form a tripod; and an energy-absorbing mechanism designed and disposed such that upon the bumper bar pivoting about a pivot axis defined by the first bearing, the resultant moment of force is introduced as linear force into the energy-absorbing mechanism and at least partly absorbed or dissipated there;

wherein the energy-absorbing devices are connectable to the vehicle under-frame at the front or rear region of the vehicle symmetrical to a vehicle longitudinal axis (L) such that the bumper bars correspond to at least part of an outer contour (K) of the front or rear region, wherein the bumper bars are designed such that there is a clearance between the end regions of said bumper bars associated with the first bearing, and wherein a mechanism is further provided which is connected to the two bumper bars and bridges a clearance between non-articulated end regions of said bumper bars;

wherein the mechanism comprises:

a buffer plate connected to the bumper bar of the first energy absorption device by a fourth bearing and to the bumper bar of the second energy absorption device by a fifth bearing such that an impact force which occurs when an object collides frontally with the buffer plate is transferred from the buffer plate to the two bumper bars through the end regions affixed to the respective bumper bars and introduced into the two energy absorption devices.

* * * * *